United States Patent
Shain et al.

(10) Patent No.: US 9,652,405 B1
(45) Date of Patent: May 16, 2017

(54) PERSISTENCE OF PAGE ACCESS HEURISTICS IN A MEMORY CENTRIC ARCHITECTURE

(71) Applicant: EMC Corporation, Hopkinton, MA (US)

(72) Inventors: Randall Shain, Wrentham, MA (US); Kenneth J. Taylor, Franklin, MA (US); Adrian Michaud, Carlisle, MA (US); Stephen Wing-Kin Au, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 169 days.

(21) Appl. No.: 14/788,079

(22) Filed: Jun. 30, 2015

(51) Int. Cl.
*G06F 12/02* (2006.01)
*G06F 12/06* (2006.01)
(Continued)

(52) U.S. Cl.
CPC ........ *G06F 12/122* (2013.01); *G06F 12/0246* (2013.01); *G06F 12/0638* (2013.01); *G06F 2212/205* (2013.01); *G06F 2212/7201* (2013.01)

(58) Field of Classification Search
CPC .............. G06F 12/122; G06F 12/0246; G06F 12/0638; G06F 2212/7201;
(Continued)

(56) References Cited

U.S. PATENT DOCUMENTS

| 9,251,003 B1 * | 2/2016 | Gupta ................. G06F 11/1469 |
| 2006/0101200 A1 * | 5/2006 | Doi ........................ G06F 3/0611 711/113 |

(Continued)

FOREIGN PATENT DOCUMENTS

WO    WO 2016122491 A1 *  8/2016  ............... G06F 3/06

OTHER PUBLICATIONS

Xiao Zhang, Sandhya Dwarkadas, Kai Shen "Towards Practical Page Coloring-based Multi-core Cache Management", University of Rochester, ACM, 2009.*

(Continued)

*Primary Examiner* — Rocio Del Mar Perez-Velez
(74) *Attorney, Agent, or Firm* — Ryan, Mason & Lewis, LLP

(57) ABSTRACT

Systems, methods, and articles of manufacture comprising processor-readable storage media are provided for managing memory by persistence of page access heuristics. For example, a method includes collecting, during run-time execution of an application, access heuristics with regard to each page of data that is accessed by the application and cached in a page cache associated with the application, and generating metadata for each cached page in the page cache. The metadata for a given cached page represents the access heuristics of the given cached page. The metadata for each cached page is maintained in a volatile memory during run-time execution of the application. Moreover, the metadata for each cached page is persistently stored in a non-volatile memory during run-time execution of the application. The persistently stored metadata for each cached page is accessed when the application is restarted to restore the page cache associated with the application to a previous state.

21 Claims, 6 Drawing Sheets

(51) Int. Cl.
*G06F 12/12* (2016.01)
*G06F 12/122* (2016.01)

(58) Field of Classification Search
CPC .. G06F 2212/205; G06F 3/0619; G06F 3/065; G06F 11/1469; G06F 12/0868; G06F 11/1451; G06F 2201/84; G06F 2212/466; G06F 11/1471; G06F 11/1458; G06F 3/0614; G06F 2201/885; G06F 2212/601; G06F 11/2056
See application file for complete search history.

(56) References Cited

U.S. PATENT DOCUMENTS

| | | | |
|---|---|---|---|
| 2007/0061511 A1* | 3/2007 | Faber | G06F 9/4418 711/113 |
| 2010/0070701 A1* | 3/2010 | Iyigun | G06F 11/1441 711/113 |
| 2011/0066808 A1* | 3/2011 | Flynn | G06F 12/0246 711/118 |
| 2011/0191522 A1* | 8/2011 | Condict | G06F 12/123 711/103 |
| 2014/0281131 A1* | 9/2014 | Joshi | G06F 12/0804 711/103 |
| 2015/0067258 A1* | 3/2015 | Jung | G06F 12/0868 711/119 |
| 2016/0266797 A1* | 9/2016 | Nagaraj | G06F 3/061 |

OTHER PUBLICATIONS

OpenDAX, Open Source Automation, http://www.opendax.org, Jun. 30, 2015, 1 page.
U.S. Appl. No. 13/925,143, filed Jun. 24, 2013 and entitled "Combined Memory and Storage Tiering."
U.S. Appl. No. 14/314,366, filed Jun. 25, 2014 and entitled "Methods and Apparatus for Memory Tiering."
U.S. Appl. No. 14/564,420, filed Dec. 9, 2014 and entitled "Second Caches for Memory and Page Caches."

* cited by examiner

PAGE COLOR/IMPORTANCE

400

PERSISTENCE OF PAGE ACCESS HEURISTICS IN A MEMORY CENTRIC ARCHITECTURE

FIELD

The field relates generally to data storage systems employed in computing systems, and in particular, to techniques for managing memory in data storage systems.

BACKGROUND

A data storage system typically includes one or more host computing devices ("hosts") in communication with one or more data storage arrays. A host typically executes an application program (e.g., a database application) which requires data associated with the application to be stored locally on the host, remotely on one of the data storage arrays, or stored both locally and remotely. The host typically includes memory devices that provide both volatile random access memory capacity (e.g., dynamic random access memory (DRAM)) and non-volatile random access memory capacity (e.g., flash memory devices). The data storage array typically includes storage devices that provide non-volatile random access storage capacity (e.g., flash memory devices) and non-volatile large storage capacity (e.g., hard disk drives (HDDs) and tape drives). Random access memory is used to satisfy high throughput and/or bandwidth requirements of a given application program while the hard disk and tape drives are used to satisfy capacity requirements. It is desirable to continually improve the performance of computing systems that utilize significant amounts of memory.

SUMMARY

One embodiment of the invention includes a method for managing memory by persisting page access heuristics. The method includes collecting, during run-time execution of an application, access heuristics with regard to each page of data that is accessed by the application and cached in a page cache associated with the application, and generating metadata for each cached page in the page cache, wherein the metadata for a given cached page represents the access heuristics of the given cached page. The metadata for each cached page is maintained in a volatile memory during run-time execution of the application. In addition, the metadata for each cached page is persistently stored in a non-volatile memory during run-time execution of the application. The persistently stored metadata for each cached page is accessed when the application is restarted to restore the page cache associated with the application to a previous state.

Other embodiments of the invention include, without limitation, computing systems and articles of manufacture comprising processor-readable storage media.

DETAILED DESCRIPTION

Figure 1:
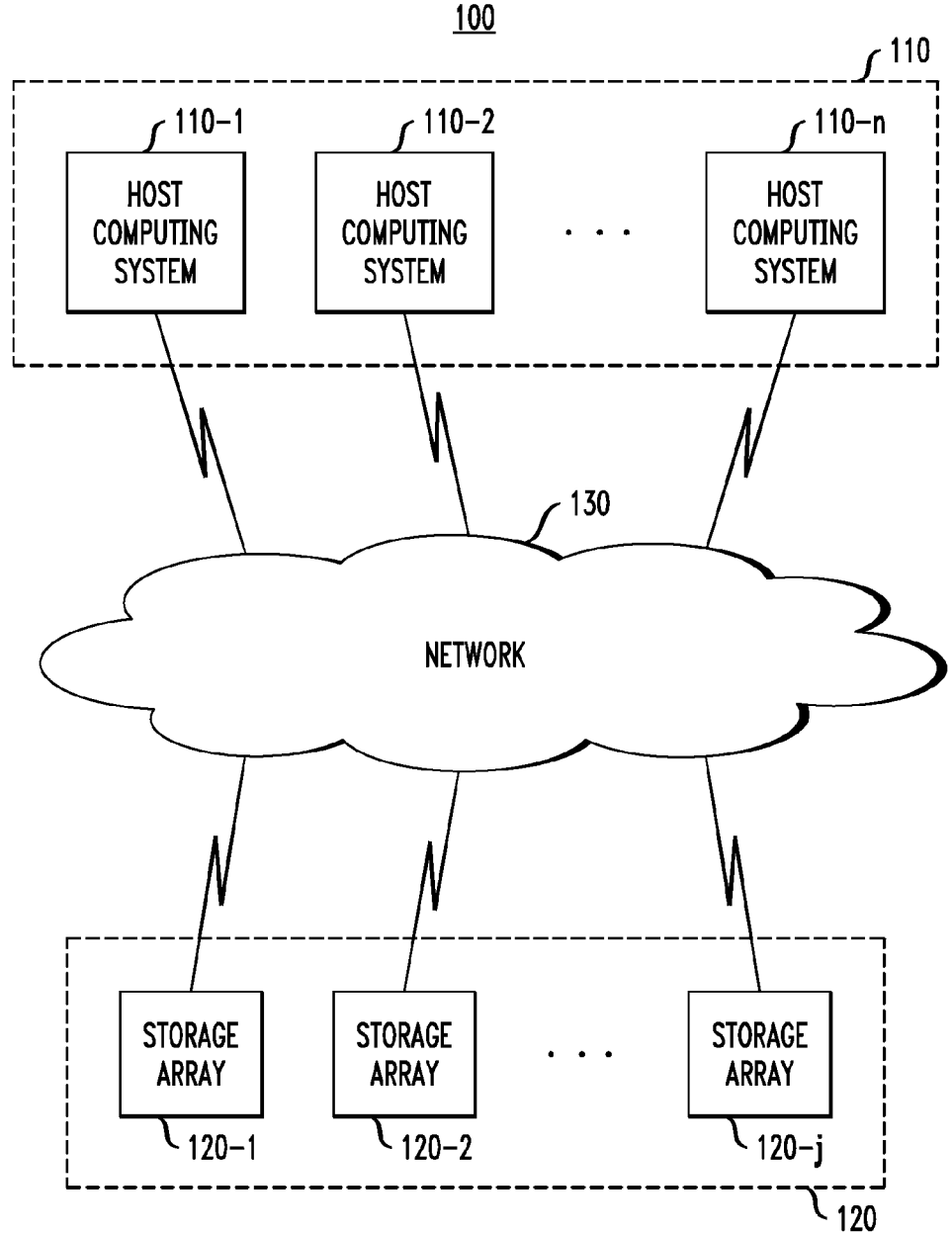
FIG. 1 is a high-level schematic illustration of a computing system which can be configured with a memory centric architecture that supports persistence of page access heuristics, in accordance with an embodiment of the invention.

Embodiments of the invention will be described herein with reference to systems and methods for managing memory by persistence of page access heuristics. Embodiments of the invention will be described with reference to illustrative computing systems, data storage systems, and associated servers, computers, memory devices, storage devices and other processing devices. It is to be appreciated, however, that embodiments of the invention are not restricted to use with the particular illustrative system and device configurations shown.

It is to be understood that the terms "computing system" and "data storage system" as used herein with respect to various embodiments are intended to be broadly construed, so as to encompass, for example, private or public cloud computing or storage systems, or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, any type of data storage system, or combination of data storage systems, including, but not limited to storage area network (SAN) systems, direct attached storage (DAS) systems, Hadoop Distributed File System (HDFS), as well as other types of data storage systems comprising clustered or distributed virtual and/or physical infrastructure.

The terms "application," "program," "application program," and "computer application program" herein refer to any type of software application, including desktop applications, server applications, database applications, and mobile applications. The terms "application process" and "process" refer to an instance of an application that is being executed within a computing environment.

The term "memory" herein refers to any type of computer memory accessed by an application using memory access programming semantics, including, by way of example, dynamic random-access memory (DRAM) and memory-mapped files. Typically, reads or writes to underlying devices are performed by an operating system (OS), not the application. As used herein, the term "storage" refers to any resource that is accessed by the application via input/output (I/O) device semantics, such as read and write system calls. In certain instances, the same physical hardware device is accessed by the application as either memory or as storage.

Moreover, the term "tiering" as used herein with regard to memory or storage refers to the placement of information on storage infrastructure resource commensurate with implementation of a defined policy. Such policies can take factors into account a variety of factors including, but not limited to: information utilization usage statistics (e.g., I/O reads, writes, memory access); customer information values associated with levels of service (e.g., gold, silver, bronze, production, test, sandbox, archive); and any other custom tiering stratification criteria.

The term "page cache" as used herein (also referred to as a disk cache) is a cache of disk-based pages kept in main memory (e.g., DRAM) by the OS for faster access. The faster access may result from a relatively faster memory technology and/or from avoiding relatively slow data transfer over a network or legacy bus. A page cache is typically implemented within a kernel via paging memory management facilities and, thus, is generally transparent to applications. Data is transferred between main memory and disk in blocks of fixed size, called "pages." As will be appreciated, the more requested pages residing in cache, the better the overall performance.

As used herein, the term "access heuristics" refers to any decision making based upon historical access information for a given cache entry. For example, a cache may maintain statistics on how frequently individual cache entries (e.g., pages) are accessed. If a given page is frequently accessed relative to another page in the cache, the given page may be migrated from one cache to another cache with less access latency. As another example, a cache may maintain statistics on how frequently cached pages are accessed and use such information to order pages in a cache according to frequency of access and evict pages that are less frequently accessed (e.g., LRU cache replacement policies).

FIG. 1 is a high-level schematic illustration of a computing system 100 which can be configured with a memory centric architecture that supports persistence of page access heuristics, in accordance with an embodiment of the invention. The computing system 100 comprises a plurality of application host computing devices 110-1, 110-2, ..., 110-n (collectively referred to as "application hosts" 110), which are operatively coupled to one or more of a plurality of data storage arrays 120-1, 120-2, ..., 120-i (collectively referred to as data storage arrays 120), over a network 130. The network 130 may comprise any known communication network such as, but not limited to, a WAN (wide area network), a LAN (local area network), a WLAN (wireless local area network), etc., or combination of networks, which implement networking protocols such as, but not limited to, Internet Protocol (IP), Ethernet, Internet Small Computer System Interface (iSCSI), Fibre Channel (FC), wireless protocols, RDMA (remote direct memory access), NVMe (NVM Express) or Non-Volatile Memory Host Controller Interface Specification (NVMHCI) (which is a specification for accessing solid-state drives (SSDs) attached through a PCI Express (PCIe) bus), or other related communication protocols, etc.

The application hosts 110 are configured to execute applications, such as database applications or other types of applications. In one embodiment, one or more of the application hosts 110 comprises a server (e.g., a Windows server, a Sun Solaris server, an HP server, a Linux server, etc.) upon which one or more applications execute. In one embodiment, the application hosts 110 (and data storage arrays 120) are components of a data center which performs data computing and data storage functions to support one or more network applications and/or on-line services that are associated with private or public entities. For example, the computing system 100 of FIG. 1 may comprise a private or public business enterprise network that hosts and manages consumer or business applications, which are used by multiple, simultaneously connected local or remote users. Depending on the implementation of the computing system 100, the application hosts 110 are configured to, e.g., execute business logic, execute scripts and services to query databases, and perform other computing functions that are needed to host and deliver consumer or business applications and services to multiple end users, service providers, and/or organizations.

Moreover, the data storage arrays 120 can be implemented using various types of persistent (non-volatile) storage elements and data storage system architectures. For instance, in one embodiment of the invention, one or more of the data storage arrays 120 may be configured as a SAN system, a DAS system, an HDFS system, as well as other types of data storage systems comprising clustered or distributed virtual and/or physical architectures. The data storage arrays 120 include one or more different types of persistent storage devices such as HDDs (hard disk drives), flash storage devices, disk storage devices, SSD (solid-state drive) devices, or other types and combinations of non-volatile memory. In one embodiment, the data storage arrays 120 comprise one or more storage products such as, by way of example, VNX® and Symmetrix VMAX®, both commercially available from EMC Corporation of Hopkinton, Mass. The EMC Symmetrix VMAX® systems are enterprise-class storage platforms comprising high performance, scalable storage arrays, which can be implemented for hyper-scale computing systems. A variety of other storage products may be utilized to implement at least some of the data storage arrays 120.

In general, the application hosts 110 execute applications using local memory resources and issue read and write requests ("commands") to one or more of the data storage arrays 120. The data storage arrays 120 are configured with storage resources that are used to store backend data files. The data storage arrays 120 process read and write commands received from the application hosts 110 and, in the case of read requests, send data stored thereon back to the requesting one of the application hosts 110. In one embodiment, the computing system 100 provides a memory and storage tier architecture, which comprises one or more tiers resident on the application hosts 110 and one or more tiers resident on the data storage arrays 120. In one embodiment, the applications executing on the application hosts 110 determine (either automatically or in response to user input) which of the various tiers to store data associated with an executing application.

In another embodiment, the computing system 100 may comprise a plurality of virtual machines (VMs) that are implemented using a hypervisor, and which execute on one or more of application hosts 110 or data storage arrays 120. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices. An example of a commercially available hypervisor platform that may be used to implement portions of the computing system 100 in one or more embodiments of the invention is the VMware® vSphere™ which may have an associated virtual infrastructure management system such as the VMware® vCenter™. The underlying physical infrastructure may comprise one or more distributed processing platforms that include storage products such as the above noted VNX® and Symmetrix VMAX® products.

In one embodiment of the invention, the computing system 100 of FIG. 1 implements a memory centric architecture (MCA) which provides applications executing on the application hosts 110 with additional virtual memory through a memory extension framework in which a plurality of MCA library functions are provided to efficiently manage multiple user virtual address spaces comprised of combinations of volatile memory, high throughput low latency next generation non-volatile memory technologies, NAND flash technologies connected to a host in various ways (e.g., PCI-e, SAS/SATA), host-connected disk technology, and various forms of SAN connected storage including both server SANs and traditional storage SANs. MCA provides an alternative "kernel-based" virtual memory manager architecture that is configured to overcome the current limitations and non-deterministic behavior provided by conventional virtual memory manager frameworks, such as the Linux virtual memory manager.

In particular, while most operating systems implement virtual memory, applications cannot address the physical memory directly, instead the operating system translates between the application's virtual address space and the system's physical address space. In this approach, every program has its own private address space and thus can run independently from other programs on the system. In such a system, the memory is organized in pages (typically 4 KB in size), and the translation between virtual and physical address space is performed using a page table. An MCA framework as described herein provides an interface for creating server class memory (SCM) tiers that extend memory and for accessing and caching SCM tiers by means of virtual memory, with enhanced memory performance, deterministic access latencies, and effective control over virtual memory.

For example, rather than allocating physical pages from a single system wide page cache as in conventional systems, an MCA framework provides a facility to pre-allocate one or more system wide fixed-size page caches. Applications control which page cache to use, which results in a more predictable execution time per process because the OS does not manage a single system wide page cache between competing processes. MCA supports pluggable memory-mapping (mmap) and page cache management policies, which control page cache replacement policies, etc. For example, two policies for deciding which pages to evict from a cache are supported: a first-in, first-out (FIFO) policy, and a least recently used (LRU) policy.

In addition, an application can tune the caching behavior by setting a low water level and an eviction size. The management of each page cache maintains the availability of free physical pages via these settings, e.g., the low water level specifies a threshold for the free memory in a page cache (below which an eviction is triggered), and the eviction size determines the number of pages evicted in such an event. This eviction strategy attempts to ensure page slot availability upon a page fault. Moreover, MCA enables bypassing of a virtual file system of a native OS and directly accessing a storage device driver, which when combined with a compatible storage device, further reduces the page fault latency.

Moreover, in accordance with embodiments of the invention, MCA supports coloring of individual pages to maximize page cache residency times and minimize the number of page faults. For example, as discussed in further detail below with reference to FIG. 3B, a page color (alternatively referred to as page temperature) can be represented as a 16-bit integer, where higher values mean the page is accessed more frequently and should be kept in the page cache when possible. Individual pages may also be pinned based on importance to maintain cache residency. In one embodiment of the invention, an application is responsible for assigning page colors to pages based on the access pattern or access heuristics of the pages. Moreover, in another embodiment of the invention, in addition to the explicit specification by the applications, a page cache manager module of the MCA system can be configured to track the access to pages and dynamically adjust page colors based on those statistics.

Furthermore, MCA employs a technique called read ahead, where it preloads a number of subsequent pages starting from the faulting page. Accesses to these pages then only cause minor instead of major page faults and thus have lower latencies. MCA tries to automatically adapt the number of read ahead pages to the applications access patterns. These features promise better performance and control for accessing secondary storage in an in-memory database. This in turn may form the basis of an effective memory tier containing colder data, where the classification of data (e.g. hot and cold) by the database is mapped onto page colors. The underlying MCA library can use this information as a hint for which data should be kept in memory and thus reduce the number of page faults.

Figure 2:
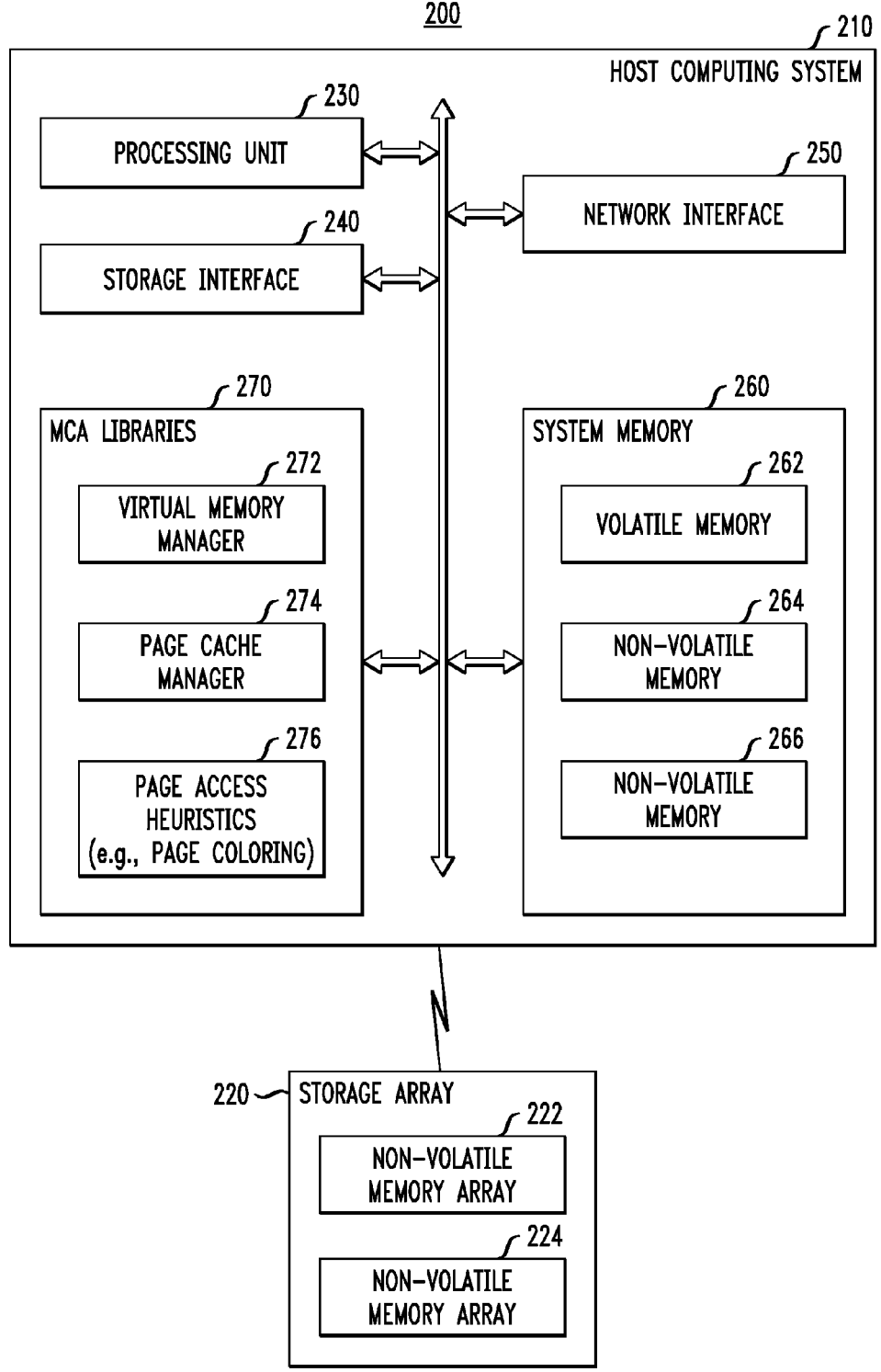
FIG. 2 schematically illustrates an embodiment of the computing system of FIG. 1 showing details of a host computing system and data storage array which implement a memory centric architecture that supports persistence of page access heuristics in accordance with an embodiment of the invention.

FIG. 2 schematically illustrates an embodiment of the computing system 100 of FIG. 1 showing details of a host computing system and data storage array to implement a memory centric architecture that supports persistence of page access heuristics in accordance with an embodiment of the invention. More specifically, FIG. 2 shows a computing system 200 comprising a host computing system 210 and a data storage array 220. The host computing system 210 comprises a processing unit 230, storage interface circuitry 240, network interface circuitry 250, system memory 260, and MCA libraries 270. The system memory 260 comprises volatile memory 262 and various levels of non-volatile memory 264 and 266. The MCA libraries 270 provide functions for implementing a memory centric architecture, wherein the functions comprise a virtual memory manager module 272, a page cache manager module 274, and a page access heuristics module 276. It is to be understood that in one embodiment of the invention, the MCA library functions 270 may be implemented as software functions that are stored in the system memory 260 and executed by the processing unit 230. In other embodiments, the MCA library functions 270 may be implemented using a combination of dedicated hardware and firmware, in addition to software.

The processing unit 230 comprises one or more of a computer processor, a microprocessor, a microcontroller, an application-specific integrated circuit (ASIC), a field programmable gate array (FPGA) or other types of processing circuitry, as well as portions or combinations of such processing circuitry. Indeed, the processing unit 230 may comprises one or more "hardware processors" wherein a hardware process is intended to be broadly construed, so as to encompass all types of processors including, for example, (i) general purpose processors and (ii) optimized processors, which comprise any possible combination of multiple "throughput cores" and/or multiple hardware-based accelerators. Examples of optimized processors include, for example, graphics processing units (GPUs), digital signal processors (DSPs), system-on-chip (SoC), ASICs, FPGAs, and other types of specialized processors or coprocessors that are configured to execute one or more fixed functions.

The storage interface circuitry 240 enables the processing unit 230 to interface and communicate with the system memory 260 and the non-volatile memory arrays 222 and 224 using one or more standard communication and/or storage control protocols to read, write and otherwise access data in persistent storage devices such as flash memory devices, DAS devices, SAN storage devices, etc., depending on the storage system(s) that are implemented. The network interface circuitry 250 enables the host computing system 210 to interface and communicate with a network and other system components. The network interface circuitry 250 may comprise conventional transceivers of a type well known in the art (e.g., network interface cards, I/O adaptors, etc.).

The system memory 260 comprises electronic memory such as random access memory (RAM), read-only memory (ROM), or other types of memory, in any combination. The system memory 260 stores one more software programs having instructions that are read and processed by the processing unit 230 to run a native operating system (OS) and one or more applications that run on the host computing system 210. The system memory 260 and other persistent storage elements described herein having program code tangibly embodied thereon are examples of what is more generally referred to herein as "processor-readable storage media" that store executable program code of one or more software programs. Other examples of processor-readable storage media embodying program code include, for example, optical or magnetic storage disks. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

In accordance with embodiments of the invention, a data storage system comprising the system memory 260 and the data storage array 220 is configured to provide a memory and storage tier architecture, comprising multiple, independent memory/storage tiers. For example, the system memory 260 of the host computing system 210 can provide a hierarchical memory tier structure wherein the volatile memory 262 (highest level in a memory tier) may comprise a dynamic random-access memory tier (e.g., DRAM) or other forms of volatile random-access memory. The non-volatile system memory 264 may comprise a storage-class memory (SCM) tier that is accessible as a memory resource. The non-volatile system memory 264 may comprise one or more SCM devices including, for example, NAND flash and next generation non-volatile memory (NGNVM) devices. The non-volatile system memory 266 may comprise an SCM tier that is accessible as an I/O resource.

Moreover, the storage tiers resident on the data storage array 220 include an SCM tier (e.g., non-volatile memory array 222) that is accessible as an I/O resource. For example, the non-volatile memory array 222 may comprise a top of rack flash memory array. Moreover, in one embodiment of the invention, the non-volatile memory array 224 may comprise a network storage tier (e.g., SAN (storage area network)). The data storage array 220 may be implemented using other storage tiers such as a serial attached storage (SAS/SATA) tier, for example. Applications running on the host computing system 210 can make data placement selections end-to-end, e.g., across the different memory/storage tiering layers, or within a given memory/storage tiering layer.

As noted above, the MCA libraries 270 provide functions for implementing a memory centric architecture comprising a hierarchical memory/storage tiering framework, for example, as described herein. The MCA libraries 270 comprise functions that are executable in a "user space" of a native OS (as opposed to a privileged kernel space of the OS) to manage virtual memory and to manage multiple independent page caches, each utilizing unique portions of different tiers of available SCM technologies in order to provide the most control of application quality of service (QoS). The pages managed in page caches originate from MCA-defined memory-mapped regions of non-volatile datastores that are included in one or more of the non-volatile memories (e.g., 266, 222, 224). The memory-mapped regions of the non-volatile datastores provide the ability to persistently maintain page-specific metadata along with the page data itself.

The virtual memory manager module 272 is utilized by an application executing on the host computing system 210 to map a private virtual address space of the application to one or more defined memory-mapped regions of non-volatile datastores, which are resident on one or more of the non-volatile memories (e.g., 266, 222, 224). This framework enables persistence of page caches across associated with one or more executing applications in the event of a reboot of the applications or the host computing system 210. Since DRAM is volatile, meaning that any data that is placed into it is lost upon power failure or other restart events, the repopulation of the application cache is a major operation concern for all application vendors that rely on large DRAM-based caches. However, embodiments of the invention as discussed herein are configured to provide non-volatile caches. For example, since an SCM is a non-volatile resource, the SCM can be used to construct and utilize memory-mapped files to be consumed as an application cache resource, thereby enabling the host computing system 210 to support non-volatile application caches that do not require expensive repopulation after a reboot or unexpected outage of the host computing system 210.

More specifically, in accordance with embodiments of the invention, the virtual memory manager 272 is configured to manage virtual memory having page caches that can be maintained in the volatile memory 262 of the system memory 260 during run-time execution of an application, and which can also be maintained in memory-mapped regions of one or more non-volatile datastores of the tiered memory/storage architecture. A plurality of page caches can be provided in physical memory where each page cache can be shared with multiple memory-mapped regions in tiered memory. An application executing in the user space of the host computing system 210 can utilize the virtual memory manager 272 library function to create one or more memory-mappings for one or more regions in the tiered memory and associate each memory-mapping with one or more page caches. In one embodiment, the page caches are dynamically configurable in size.

In a data storage environment as shown in FIG. 2 comprising a combination of memory tiering and storage tiering, the memory tiers are constructed by memory mapping a region of a storage class memory (SCM) device or a region of an array storage device into the virtual address spaces of applications. In one embodiment, each memory mapped region in tiered memory is fronted by a DRAM page cache to which an application issues loads and stores. The virtual memory manager 272 function can be utilized by an application to move data between an SCM or array device and the DRAM page cache on an on-demand page basis.

The page cache manager module 274 actively tracks the usage of each page in a given page cache, and as the access frequency of a given page increases, its perceived importance, reflected by its page color, also increases. The page cache manager 274 and/or the applications executing on the host computing system 210 can utilize the page access heuristics module 276 to track and collect page access patterns and assign a "page color" to a given page based on, e.g., the frequency of access of the page by the application. For example, pages that are more frequently accessed from memory by a given application can be assigned higher temperatures (i.e., higher page color values), which can result in the pages being retained longer within a page cache and/or being placed in lower latency (e.g., higher level) tiers of an SCM hierarchy. Likewise, pages with lower temperatures (i.e., lower page color values) can face demotion to lower tiers or cache eviction.

Over some period of time during run-time execution wherein an application approaches its steady state performance, the collective state of page colors for each page of a given page cache is mapped to a given region, and becomes a valuable commodity. Indeed, in a page cache system, it can take a long time for the collection of pages involved to reach their respective ideal priorities, or color (i.e. cache warming). Therefore, rather than losing such page coloring information every time an application is restarted for any reason, embodiments of the invention enable such information to be collected and persistently maintained during run-time execution of the applications. In this regard, the pages associated with a given memory-mapped region in a non-volatile datastore can begin with specific page color information when a new mapping is created upon launching of an application. This persistence of the page color information during run-time provides the ability to restore the associated collection of pages to the most advantageous locations within the cache hierarchy, thereby allowing an application to quickly return to the state of performance previously exhibited based on the persisted page color information.

Figure 3A:
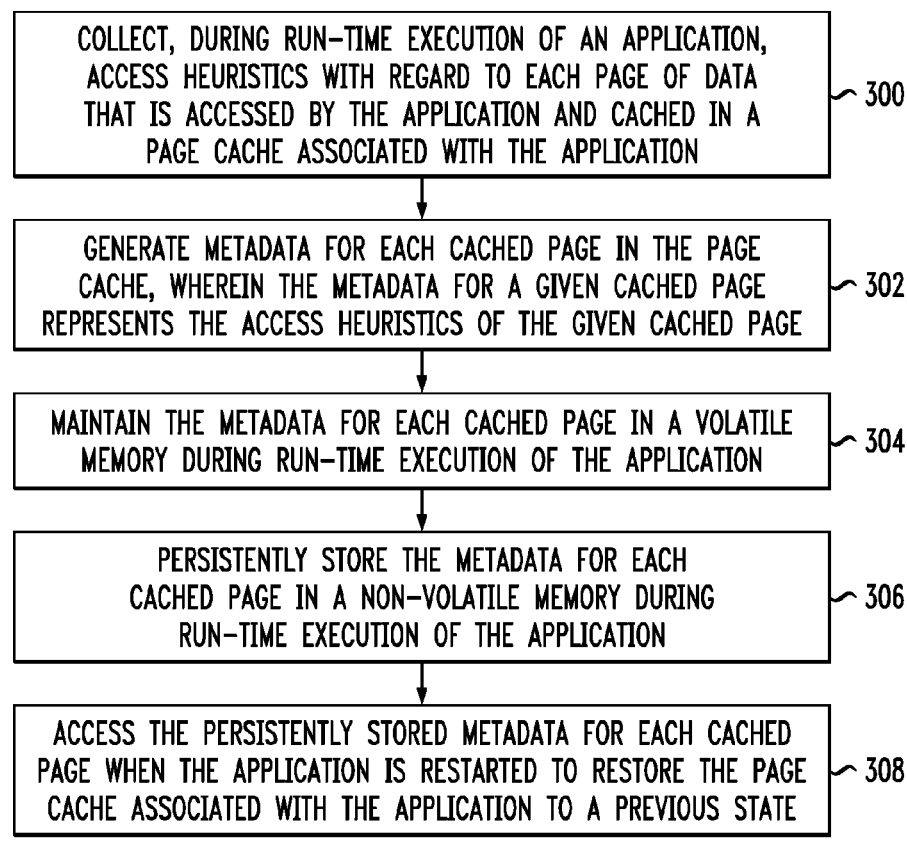
FIG. 3A is a flow diagram of a method to provide persistence of page access heuristics in accordance with an embodiment of the invention.
Figure 3B:
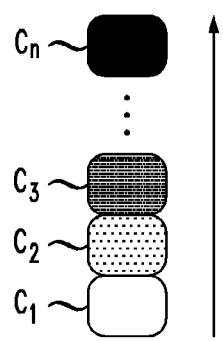
FIG. 3B schematically illustrates a method which can be implemented in the process flow of FIG. 3A to provide page coloring, according to an embodiment of the invention.

FIGS. 3A and 3B are diagrams that illustrate methods to manage memory in accordance with embodiments of the invention. In particular, FIG. 3A is a flow diagram of a method to provide persistence of page access heuristics in accordance with an embodiment of the invention, and FIG. 3B schematically illustrates a method which can be implemented in the process flow of FIG. 3A to provide page coloring based on frequency of access of memory pages, according to an embodiment of the invention. Referring to FIG. 3A, a method for managing memory begins by collecting, during run-time execution of an application, access heuristics with regard to each page of data that is accessed by the application and cached in a page cache associated with the application (block 300). In one embodiment of the invention, a process of collecting access heuristics comprises tracking a frequency of access of each page by the application during the run-time execution of the application. The access heuristics can be collected by the application itself, or the page cache manager module 274 of the host computing system 210 (FIG. 2). In another embodiment, both the application and cache manager module 274 can collect access heuristics and combine the collected heuristics to perform functions as described herein.

Next, the access heuristics are utilized to generate metadata for each cached page in the page cache, wherein the metadata for a given cached page represents the access heuristics of the given cached page (block 302). In one embodiment of the invention, as will be discussed below in detail with reference to FIG. 3B, a process of generating metadata for each cached page in the page cache comprises assigning one of a plurality of predefined page colors to each cached page. In one embodiment, a given page color can represent an access frequency value or an importance value of the cached page. The access heuristics of a given page and associated metadata are collected and generated using methods implemented by the page heuristics module 276 (FIG. 2).

The metadata for each cached page is maintained in a volatile memory during run-time execution of the application (block 304). For example, in the embodiment of FIG. 2, the metadata for each cached page in one or more page caches utilized by the executing application are stored in the volatile memory 262 of the system memory 260 of the host computing system 210. This metadata is continually updated and utilized during run-time to, e.g., implement cache eviction techniques (e.g., LRU eviction) and to determine where to store the different portions of a given page cache (e.g., different blocks of cached pages in a given page cache) across one or more tiers of the system memory 260 including the volatile memory 262 and the non-volatile memories 264 and 266 during run-time.

Moreover, during run-time of the application, the metadata for each cached page is persistently stored in a non-volatile memory (block 306). For example, in one embodiment of the invention, the metadata for each cached page is persistently stored in a memory-mapped region of a non-volatile datastore, which is mapped to a virtual address space of the application. The timing at which the metadata is persistently stored during run-time execution is based on one or more predefined events, e.g., an update event in which the metadata of at least one cached page in the volatile memory is updated (e.g., a page is evicted from page cache, a page is added to page cache, the access heuristics (e.g., page color) of a given cached page is updated, etc.).

At some point, execution of the application may terminate due to power loss, system reboot, or some other termination event, etc. Upon restart of the application, the persistently stored metadata for each cached page is accessed to restore the page cache associated with the application to a previous state (block 308). For example, in one embodiment of the invention, the persistently stored metadata is used to order the pages of the page cache in sequence from a least frequently accessed page to a most frequently accessed page as in a previous state of the page cache of the application at the time of the termination event of the application. In another embodiment, the metadata can be used to restore a first portion of page cache (e.g., one set of pages in the page cache with high importance or high access frequency) in the volatile memory and to restore a second portion of the page cache (e.g., another set of pages in the page cache with less importance or access frequency) in a lower memory tier.

FIG. 3B schematically illustrates a method which can be implemented in the process flow of FIG. 3A to provide page coloring according to an embodiment of the invention. In particular, FIG. 3B shows a plurality of page colors $C_1$, $C_2$, $C_3$, . . . , $C_n$ which can be assigned to a given page based on certain access heuristics of the given page. In one embodiment of the invention, each page color comprises an n-bit integer, wherein the number of different page colors that can be assigned to a given page is $2^n$. For example, in one embodiment where each page color is represented by a 16-bit integer, a maximum number (n) of different page colors that may be assigned is $2^{16}$. In the example embodiment of FIG. 3B, the lowest page color value is $C_1$, whereas the highest page color value is $C_n$. The page color value $C_1$, $C_2$, $C_3$, . . . , $C_n$ assigned to a given page represents a "hotness" of the given page, and can be used to manage a cache replacement policy. For example, a higher color page value means that a given page is "hotter" so that the given page should not be evicted from a page cache over another page in the page cache which is "colder", e.g., has a lower page color value. It is to be understood that a "hotter" page is defined as a page which is either accessed more frequently than another ("colder") page or that the importance of the data within the page is such that the access cost should be minimized in terms of latency and/or throughput regardless of access frequency.

Figure 4A:
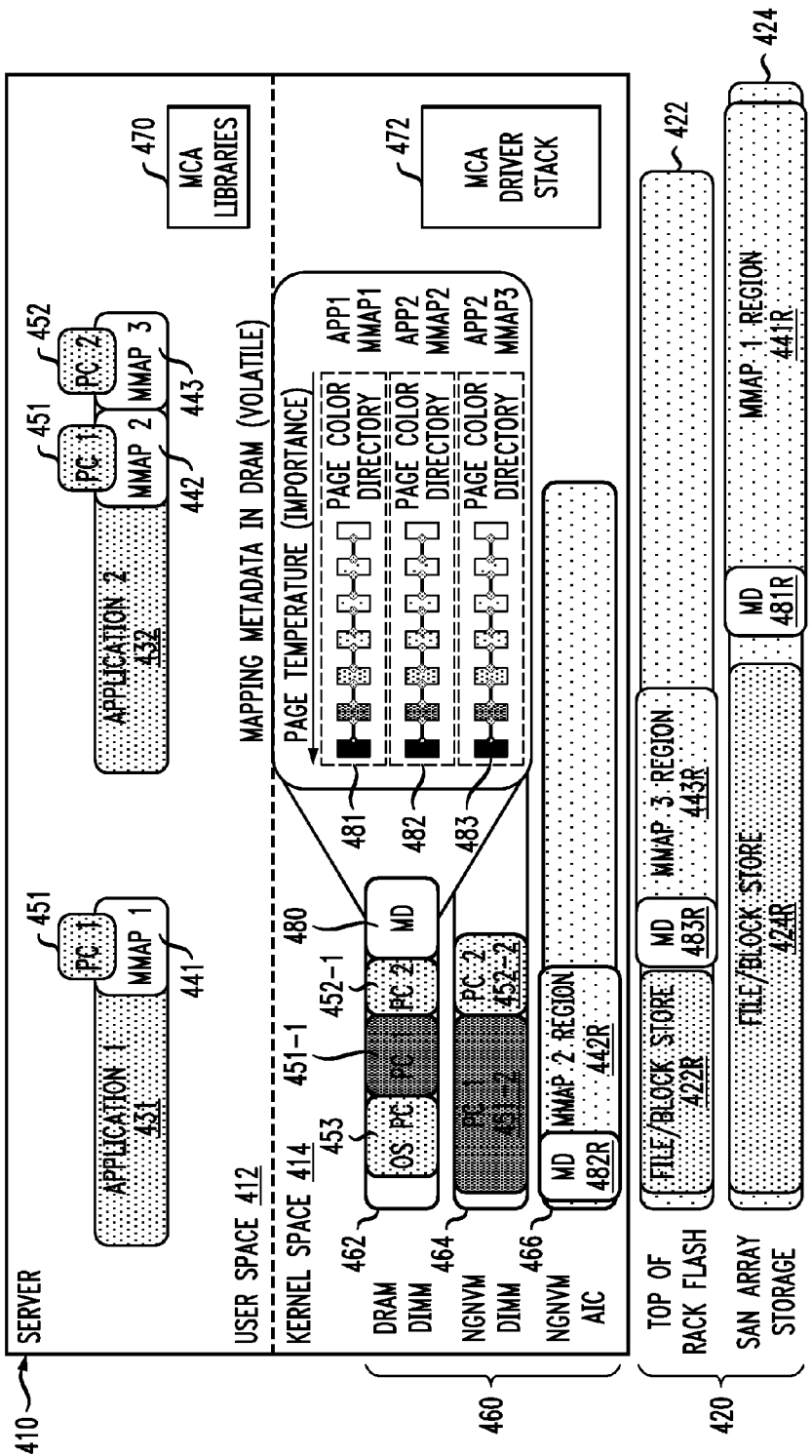
FIGS. 4A and 4B schematically illustrate a method which is implemented by a computing system to provide persistence of page access heuristics in accordance with an embodiment of the invention, wherein FIG. 4A schematically illustrates a state of a host computing system and data storage array during run-time execution of an application, and wherein FIG. 4B schematically illustrates a state of the host computing system and data storage array when the application is no longer executing.
Figure 4B:
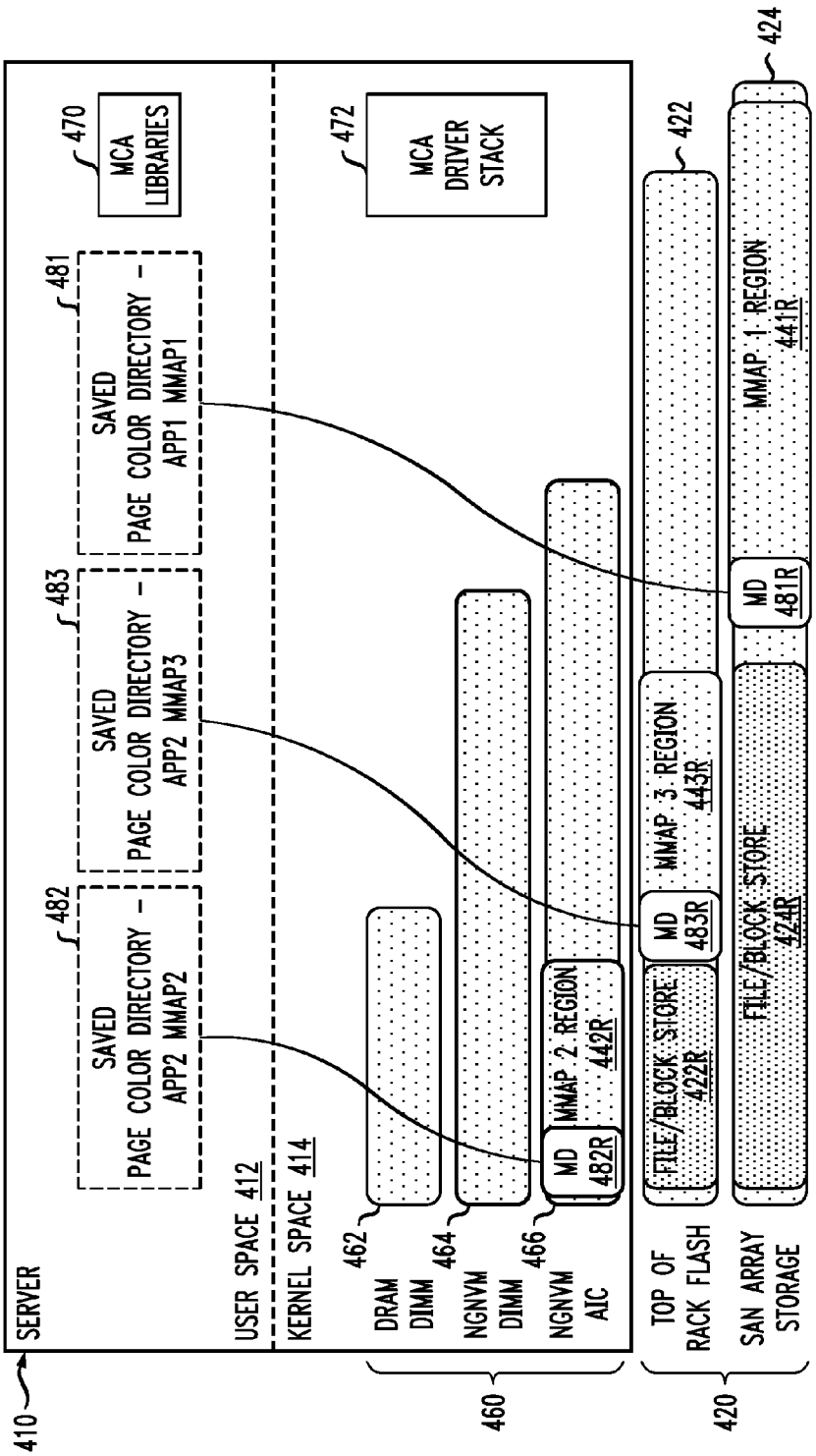

FIGS. 4A and 4B schematically illustrate a method which is implemented by a computing system 400 to provide persistence of page access heuristics in accordance with an embodiment of the invention. The computing system 400 comprises an application host 410 and a data storage array 420 (alternatively referred to herein as "off-host infrastructure" 420). The application host 410 comprises an operating system (OS) in which one or more applications 431 and 432 and MCA libraries 470 execute in a user space 412, and wherein a system memory 460 and associated MCA memory drivers 472 operate in a privileged kernel space 414 of the OS. In one embodiment of the invention, the application host 410 comprises a computing server such as a database server, file server, mail server, web server, application server, etc.

The system memory 460 comprises a memory tier structure comprising multiple levels of system memory including a volatile memory 462, a first non-volatile memory 464, and a second non-volatile memory 466. The off-host infrastructure 420 comprises a storage tier structure comprising a non-volatile memory array 422 and a SAN storage array 424. In one embodiment, the non-volatile memory array 422 comprises a flash memory array (e.g., top of rack flash memory array).

In one embodiment of the invention, the volatile memory 462 comprises volatile DRAM (Dynamic Random Access Memory) module (e.g., a DIMM (Dual In-line Memory Module)). In addition, the non-volatile memory 464 can be implemented with any suitable NGNVM (next generation non-volatile memory) DIMM, and the non-volatile memory 466 can be implemented with any suitable NGNVM AIC (add in card) module.

In accordance with embodiments of the invention, page coloring metadata can be persistently maintained along with associated page data in one or more persistent storage media across the system memory 460 and off-host infrastructure 420 tiering structure during and after run-time execution of applications 431 and 432 hosted by the host OS. In particular, FIG. 4A schematically illustrates a state of the application host 410 and the off-host infrastructure 420 during run-time execution of one or more applications including a first application 431 and a second application 432 executing in the user space 412 of the host OS. Each of the applications 431 and 432 has an associated private virtual address space which comprises a memory mapping which maps a region within one or more of the non-volatile memory datastores into the private virtual address space the application.

For example, as shown in FIG. 4A, a virtual address space associated with the first application 431 comprises a memory mapping 441 ("mmap 1") which maps to a given region 441R ("mmap 1 region") within the SAN storage array 424. Moreover, a virtual address space associated with the second application 432 comprises a memory mapping 442 ("mmap 2") which maps to a given region 442R ("mmap 2 region") within the non-volatile memory 466 of the system memory 460, and a memory mapping 443 ("mmap 3") which maps to a given region 443R ("mmap 3 region") within the non-volatile storage array 422. As further shown in FIG. 4A, the non-volatile storage array 422 comprises a file/block storage region 422R, and the SAN storage array 424 comprises a file/block storage region 424R, from which pages of data can be accessed by the executing applications 431 and 432

In the example embodiment, the first application 431 utilizes a first page cache 451 ("PC 1") to store pages that are frequently accessed by the first application 431 during run-time execution of the first application 431. In addition, the second application 432 utilizes the first page cache 451 as well as a second page cache 452 ("PC 2") to store pages that are frequently accessed by the second application 432 during run-time execution of the second application 432. As further shown in FIG. 4A, the memory mapping 441 of the first application 431 references the first page cache 451, and the memory mapping 442 of the second application 432 references the first page cache 451. Further, the memory mapping 443 of the second application 432 references the second page cache 452. In this regard, in the embodiment of FIG. 4A, the first page cache 451 is shared between the applications 431 and 432, while the second page cache 452 is exclusively utilized by the second application 432.

As further shown in FIG. 4A, during run-time execution of the first and second applications 431 and 432, the volatile memory 462 of the system memory 460 maintains an OS page cache 453, a portion 451-1 of the first page cache 451, a portion 452-1 of the second page cache 452, and current metadata 480 ("MD") associated with the first and second page caches 451 and 452. In addition, the non-volatile memory 464 of the system memory 460 maintains a portion 451-2 of the first page cache 451, and a portion 452-2 of the second page cache 452. In this embodiment, the cached pages included in the first and second page caches 451 and 452 are split into different portions, wherein the cached pages that are more frequently accessed by the applications 431 and 432 are stored in the cache portions 451-1 and 452-1 of the first and second caches 451 and 452 in the volatile memory 462, while the cached pages that are less frequently accessed by the applications 431 and 432 are stored in the cache portions 451-2 and 452-2 of the first and second caches 451 and 452 in the non-volatile system memory 464. While the volatile system memory 462 may provide the least amount of access latency in the memory/storage tiering hierarchy, the non-volatile system memory 464 can be configured to have an access latency which is acceptable to store cached pages of the first and second page caches 451 and 452 which are less frequently accessed than the cached pages stored in the volatile system memory 462.

As noted above, the current page cache metadata 480 is maintained and updated in the volatile system memory 462 during run-time execution of the applications 431 and 432. FIG. 4A illustrates an exploded view of the page cache metadata 480. As shown, the page cache metadata 480 comprises a plurality of page color directories that are managed by the MCA system using one or more functions of the MCA libraries 470. In particular, in the example embodiment shown in FIG. 4A, the page cache metadata 480 comprises three active page color directories including a first page color directory 481, a second page color directory 482, and a third page color directory 483. The first page color directory 481 is associated with the active memory mapping 441 of the first application 431, the second page color directory 482 is associated with the active memory mapping 442 of the second application 432, and the third page color directory 483 is associated with the active memory mapping 443 of the second application 432. Each page color directory 481, 482, and 483 comprises information with regard to a given page color for each cached page currently stored in the caches 451 and 452, as well as the physical location of such cached pages in the associated memory-mapped regions 441R, 442R, and 443R of the respective non-volatile datastores.

During run-time execution of the applications 431 and 432, the current page cache metadata 480 (e.g., page color for each cached page) can be written to one or more of the non-volatile memory-mapped regions 441R, 442R, and 443R at the same time as, or within a small epoch after, the page data of the cached pages is updated. More specifically, as shown in FIG. 4A, the non-volatile memory-mapped region 441R comprises a metadata block 481R which persistently stores page color information that exists in the page color directory 481 of the runtime metadata 480 (stored in the volatile system memory 462), along with associated page data that is persistently stored in the non-volatile memory-mapped region 441R. In addition, the non-volatile memory-mapped region 442R comprises a metadata block 482R which persistently stores page color information that exists in the page color directory 482 of the runtime metadata 480, along with associated page data that is persistently stored in the non-volatile memory-mapped region 442R. Moreover, the non-volatile memory-mapped region 443R comprises a metadata block 483R which persistently stores page color information that exists in the page color directory 483 of the runtime metadata 480, along with associated page data that is persistently stored in the non-volatile memory-mapped region 443R.

When the applications 431 and 432 are no longer executing, the current page cache metadata 480 (e.g., information of page color directories 481, 482, and 483) that existed at the time of application shut down will be written to respective metadata blocks 481R, 482R, and 483R within the respective non-volatile memory-mapped regions 441R, 442R, and 443R. For example, FIG. 4B schematically illustrates a state of the application host 410 and the off-host infrastructure 420 after the first and second applications 431 and 432 have been shut down and are no longer executing. In FIG. 4B, the applications 431 and 432 have been shut down and the memory mappings 441, 442, and 443 are no longer active. In this state, as illustrated in FIG. 4B, the page color information of the page color directories 481, 482 and 483 are persistently stored in the respective metadata blocks 481R, 482R, and 483R, along with the page data. With this architecture, the page coloring information associated with user pages stored in the non-volatile memory-mapped regions 441R, 442R, and 443R can be retrieved at some future point in time when one or more of the applications 431 and 432, for example, are re-started and proceed to map the memory-mapped regions again.

It is to be appreciated that in accordance with embodiments of the invention, the page color information stored within a mmap region datastore is completely independent of preexisting, or subsequently constructed, page cache instances. This provides a benefit to any page cache design or instance that can make use of the intrinsic value that such page coloring information provides. Moreover, the page color information stored in a memory-mapped region of a non-volatile datastore is tier neutral. In this regard, if a given memory-mapped region of a given non-volatile datastore is relocated to another memory/storage array tier, the accompanying page color information retains its intrinsic value.

It is to be understood that various configurations can be implemented to control how often, or at what point in the page data handling process, page color information is updated in a persistent region store. In one embodiment, the timing at which the page access heuristics are persistently stored and/or the actual location within a mmap region datastore the page color information will persistently reside, are user-configurable parameters. For example, with regard to the timing of when page color information will be updated in persistent storage, in one embodiment of the invention as noted above, page color information for each page can be written to an associated mmap region datastore at the same time as, or within a small epoch after, the page data is updated in system memory. Moreover, with regard to the location within a mmap region datastore wherein page color information can persistently reside, FIGS. 5 and 6 illustrate alternate embodiments for persistently storing page color metadata.

Figure 5:
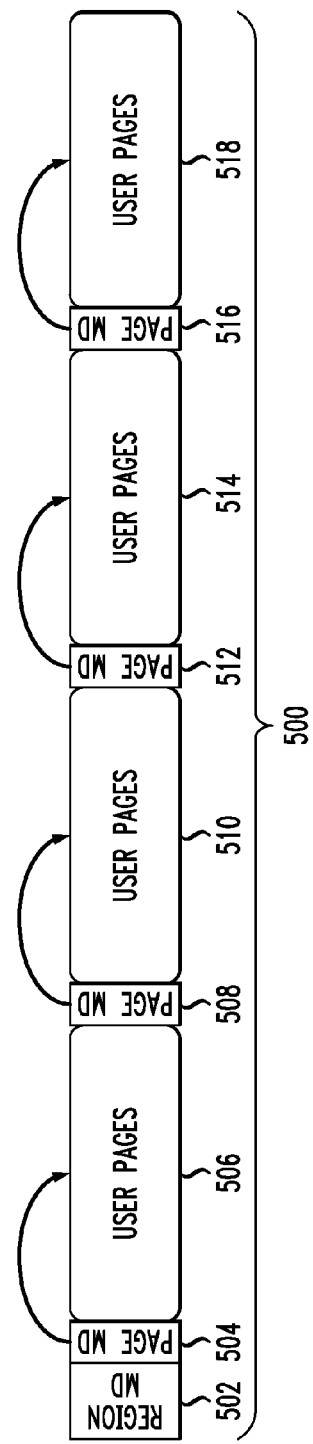
FIG. 5 schematically illustrates a method for persistently storing blocks of page color metadata, along with associated blocks of user pages, in a distributed fashion across a memory-mapped region of a non-volatile datastore, according to an embodiment of the invention.

In particular, FIG. 5 schematically illustrates a method for persistently storing page color information in metadata pages in a distributed fashion in a memory-mapped region of a datastore, according to an embodiment of the invention. FIG. 5 illustrates a memory-mapped region 500 within a non-volatile memory. The memory-mapped region 500 comprises a block of region metadata 502 at the beginning of the memory-mapped region 500, which comprises standard information regarding the region. In addition, the memory-mapped region 500 comprises multiple blocks of page metadata 504, 508, 512, and 516, which are distributed across the memory-mapped region 500 among blocks of user pages 506, 510, 514, and 518. As schematically depicted by the arrows shown in FIG. 5, the blocks of page metadata 504, 508, 512, and 516 provide page color information for respective blocks of user pages 506, 510, 514, and 518.

In the embodiment of FIG. 5, page color information can be stored in a single metadata page every $P_B/C_B$ pages, wherein $P_B$ denotes the page size in bytes, and wherein $C_B$ denotes the page color word size in bytes. In an embodiment wherein a page color value is 16-bits, $C_B$ would be equal to 2 (i.e., 2 bytes). Assuming the page size $P_B$ is 4 KB, the blocks of page color metadata 508, 512, and 516 (after the first block of page color metadata 504) would be physically located every 4 KB/2B, or 2048 pages.

Figure 6:
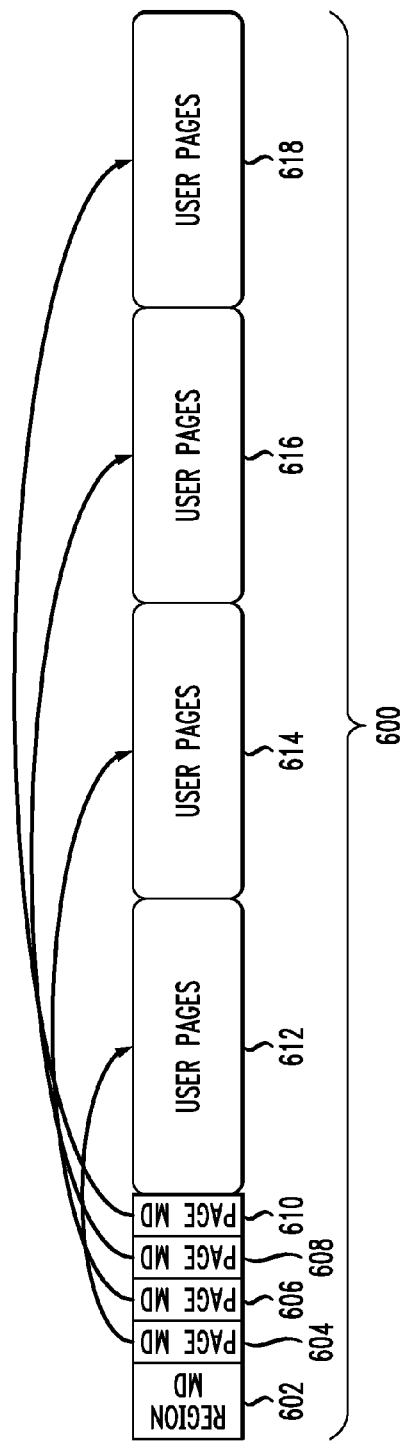
FIG. 6 schematically illustrates a method for persistently storing a cluster of blocks of page color metadata, along with associated blocks of user pages, in a memory-mapped region of a non-volatile datastore, according to another embodiment of the invention.

While FIG. 5 schematically illustrates a method for locating the blocks of page color metadata in a distributed manner across a memory-mapped region of a non-volatile datastore, FIG. 6 schematically illustrates a method for persistently storing a cluster of blocks of metadata pages in a memory-mapped region of a non-volatile datastore, according to another embodiment of the invention. In particular, FIG. 6 illustrates a memory-mapped region 600 within a non-volatile memory, which comprises a block of region metadata 602 at the beginning of the memory-mapped region 600. In addition, the memory-mapped region 600 comprises a cluster of contiguous blocks page metadata 604, 606, 608, and 610 at a beginning of the memory-mapped region 600 of the non-volatile datastore following the block of region metadata 602.

The memory-mapped region 600 of the non-volatile datastore further comprises contiguous blocks of user pages 612, 614, 616, and 618, following the contiguous blocks of page metadata 604, 606, 608, and 610. As schematically depicted by the arrows shown in FIG. 6, the blocks of page metadata 604, 606, 608, and 610 provide page color information for respective blocks of user pages 612, 614, 616, and 618.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for managing memory, comprising:
   mapping a virtual address space of an application to a memory-mapped region of a non-volatile memory;
   collecting, during run-time execution of the application, access heuristics with regard to each page of data that is accessed by the application and cached in a page cache associated with the application;
   generating metadata for each cached page in the page cache associated with the application, wherein the metadata for a given cached page represents the access heuristics of the given cached page;
   maintaining the metadata associated with each cached page of the application in a volatile memory during run-time execution of the application;
   persistently storing a current state of the metadata for each cached page in the memory-mapped region of the non-volatile memory during run-time execution of the application, wherein the current state of the metadata for each cached page in the volatile memory is persistently stored in the memory-mapped region of the non-volatile memory upon each occurrence of at least one predefined event during run-time execution of the application; and
   accessing the current state of the persistently stored metadata from the memory-mapped region of the non-volatile memory when the application is restarted to restore the page cache associated with the application to a previous state.

2. The method of claim 1, wherein collecting the access heuristics comprises tracking a frequency of access of each page by the application during the run-time execution of the application.

3. The method of claim 1, wherein collecting the access heuristics is performed by at least one of (i) the application and (ii) a page cache manager of host computing system on which the application executes.

4. The method of claim 1, wherein generating the metadata for each cached page in the page cache associated with the application comprises assigning one of a plurality of predefined page colors to each cached page, wherein a given page color represents one of an access frequency value and an importance value of the cached page.

5. The method of claim 1, wherein the memory-mapped region is defined in a non-volatile memory that is part of a tiered memory framework which comprises multiple tier levels of non-volatile system memory and an off-infrastructure storage tier, and wherein different portions of the virtual address space of the application are mapped to different memory-mapped regions in different tier levels of the tiered memory framework.

6. The method of claim 1, wherein the predefined event comprises an update of metadata of at least one cached page in the volatile memory.

7. The method of claim 1, wherein accessing the current state of the persistently stored metadata from the memory-mapped region of the non-volatile memory when the application is restarted to restore the page cache associated with the application to a previous state comprises using the metadata to order the pages of the page cache from a least frequently accessed page to a most frequently accessed page.

8. The method of claim 1, wherein accessing the current state of the persistently stored metadata from the memory-mapped region of the non-volatile memory when the application is restarted to restore the page cache associated with the application to a previous state comprises restoring a first portion of the page cache in the volatile memory and restoring a second portion of the page cache in a lower memory tier.

9. An article of manufacture comprising a processor-readable storage medium having stored therein program code of one or more software programs, wherein the program code is executable by one or more processors to:
   map a virtual address space of an application to a memory-mapped region of a non-volatile memory;
   collect, during run-time execution of the application, access heuristics with regard to each page of data that is accessed by the application and cached in a page cache associated with the application;
   generate metadata for each cached page in the page cache associated with the application, wherein the metadata for a given cached page represents the access heuristics of the given cached page;
   maintain the metadata associated with each cached page of the application in a volatile memory during run-time execution of the application;
   persistently store a current state of the metadata for each cached page in the memory-mapped region of the non-volatile memory during run-time execution of the application, wherein the current state of the metadata for each cached page in the volatile memory is persistently stored in the memory-mapped region of the non-volatile memory upon each occurrence of at least one predefined event during run-time execution of the application; and
   access the current state of the persistently stored metadata from the memory-mapped region of the non-volatile memory when the application is restarted to restore the page cache associated with the application to a previous state.

10. The article of manufacture of claim 9, wherein the program code to collect the access heuristics further comprises program code that is executable by the one or more processors to track a frequency of access of each page by the application during the run-time execution of the application.

11. The article of manufacture of claim 9, wherein the access heuristics are collected by at least one of (i) the application and (ii) a page cache manager of host computing system on which the application executes.

12. The article of manufacture of claim 9, wherein the program code to generate the metadata for each cached page in the page cache associated with the application further comprises program code that is executable by the one or more processors to assign one of a plurality of predefined page colors to each cached page, wherein a given page color represents one of an access frequency value and an importance value of the cached page.

13. The article of manufacture of claim 9, wherein the memory-mapped region is defined in a non-volatile memory that is part of a tiered memory framework which comprises multiple tier levels of non-volatile system memory and an off-infrastructure storage tier, and wherein different portions of the virtual address space of the application are mapped to different memory-mapped regions in different tier levels of the tiered memory framework.

14. The article of manufacture of claim 9, wherein the predefined event comprises an update of metadata of at least one cached page in the volatile memory.

15. The article of manufacture of claim 9, wherein the program code to access the current state of the persistently stored metadata from the memory-mapped region of the application of the non-volatile memory when the application is restarted to restore the page cache associated with the application to a previous state further comprises program code that is executable by the one or more processors to use the metadata to order the pages of the page cache from a least frequently accessed page to a most frequently accessed page.

16. The article of manufacture of claim 9, wherein the program code to access the current state of the persistently stored metadata from the memory-mapped region of the application of the non-volatile memory when the application is restarted to restore the page cache associated with the application to a previous state further comprises program code that is executable by the one or more processors to restore a first portion of the page cache in the volatile memory and to restore a second portion of the page cache in a lower memory tier.

17. A system, comprising:
a host computing system comprising:
at least one processor; and
system memory comprising a volatile memory and a non-volatile memory, wherein the non-volatile memory is configured to store an application and software functions; and
an off-host infrastructure, coupled to the host computing system, wherein the off-host infrastructure comprises at least one storage array;
wherein the software functions are executable by the at least one processor of the host computing system to:
map a virtual address space of the application to a memory-mapped region of at least one of (i) the non-volatile memory of the system memory and (ii) the at least one storage array of the off-host infrastructure;
collect, during run-time execution of the application on the host computing system, access heuristics with regard to each page of data that is accessed by the application from at least one of (i) the non-volatile memory of the system memory and (ii) the at least one storage array of the off-host infrastructure, and cached in a page cache associated with the application;
generate metadata for each cached page in the page cache associated with the application, wherein the metadata for a given cached page represents the access heuristics of the given cached page;
maintain the metadata associated with each cached page of the application in the volatile memory of the system memory during run-time execution of the application;
persistently store a current state of the metadata for each cached page in the memory-mapped region of said at least one of (i) the non-volatile memory of the system memory and (ii) the at least one storage array of the off-host infrastructure, during the run-time execution of the application, wherein the current state of the metadata for each cached page in the volatile memory of the system memory is persistently stored in the memory-mapped region upon each occurrence of at least one predefined event during run-time execution of the application; and
access the current state of the persistently stored metadata from the memory-mapped region when the application is restarted to restore the page cache associated with the application to a previous state.

18. The system of claim 17, wherein the software functions to collect the access heuristics further comprise software functions that are executable by the at least one processor to track a frequency of access of each page by the application during the run-time execution of the application.

19. The system of claim 17, wherein the software functions to generate the metadata for each cached page in the page cache associated with the application further comprise software functions that are executable by the at least one processor to assign one of a plurality of predefined page colors to each cached page, wherein a given page color represents one of an access frequency value and an importance value of the cached page.

20. The system of claim 17, wherein the system memory and the at least one storage array are configured to provide a tiered memory framework which comprises multiple tier levels of non-volatile memory, and wherein different portions of the virtual address space of the application are mapped to different memory-mapped regions in different tier levels of the tiered memory framework.

21. The system of claim 17, wherein the at least one storage array of the off-host infrastructure comprises a non-volatile memory array and a SAN (storage area network) storage array.

* * * * *